United States Patent
Hama et al.

(10) Patent No.: US 8,643,908 B2
(45) Date of Patent: Feb. 4, 2014

(54) COLOR ADJUSTMENT DEVICE, IMAGE FORMING APPARATUS, AND COMPUTER READABLE MEDIUM

(75) Inventors: Daigo Hama, Kanagawa (JP); Noriko Sakai, Kanagawa (JP); Masaomi Sakamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 321 days.

(21) Appl. No.: 13/117,774

(22) Filed: May 27, 2011

(65) Prior Publication Data

US 2012/0113441 A1    May 10, 2012

(30) Foreign Application Priority Data

Nov. 5, 2010  (JP) ................................. 2010-249224

(51) Int. Cl.
*H04N 1/60* (2006.01)
(52) U.S. Cl.
USPC ........... 358/3.23; 358/1.9; 358/518; 358/523; 358/524; 382/162; 382/167; 345/600; 345/602
(58) Field of Classification Search
USPC ......... 358/1.9, 3.23, 500, 501, 504, 518, 520, 358/523, 524; 382/162, 167; 345/602, 601, 345/600
See application file for complete search history.

(56) References Cited

U.S. PATENT DOCUMENTS

| 5,943,143 | A | 8/1999 | Kawai et al. | |
| 2003/0053094 | A1* | 3/2003 | Ohga et al. | .................. 358/1.9 |
| 2006/0238655 | A1* | 10/2006 | Chou | .......................... 348/645 |

FOREIGN PATENT DOCUMENTS

| JP | 07-023245 A | 1/1995 |
| JP | 2005-064727 A | 3/2005 |
| JP | 2006-094117 A | 4/2006 |

* cited by examiner

*Primary Examiner* — King Poon
*Assistant Examiner* — Jamares Q Washington
(74) *Attorney, Agent, or Firm* — Sughrue Mion, PLLC

(57) ABSTRACT

A color adjustment device includes: a conversion unit that converts color values of a second color space stored in a color conversion table, which defines a correspondence relation between color values of a first color space and color values of the second color space, into color values of a third color space independent from a device outputting an image; a storage unit that stores tables that define different input-output characteristics depending on color values of the third color space; and a change unit that selects at least one table from the tables according to a specified adjustment method, and executes a change process that changes color values of the second color space stored in the color conversion table by using the at least one table.

7 Claims, 15 Drawing Sheets

FIG. 5A-2
FIG. 5B-2
FIG. 5C-2
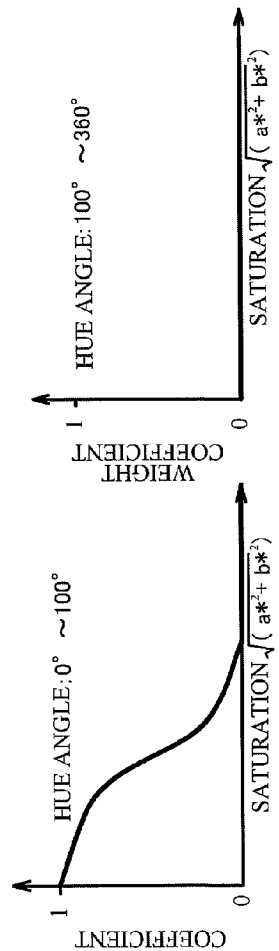
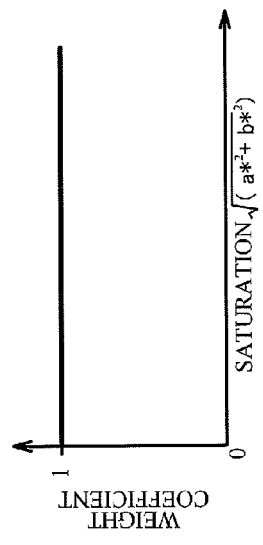
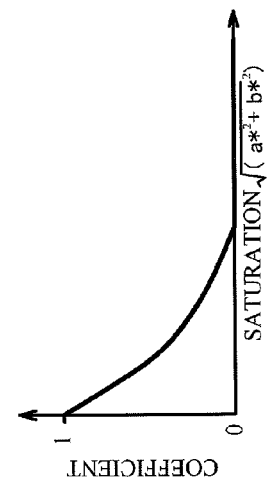
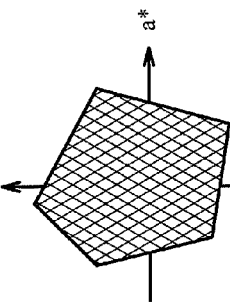
FIG. 5A-1
CASE OF "WHOLE REGION"
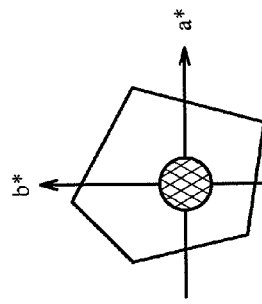
FIG. 5B-1
CASE OF "GRAY REGION"
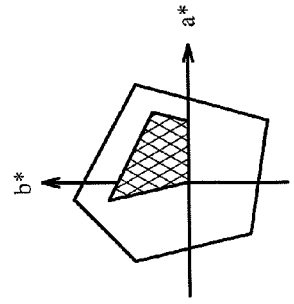
FIG. 5C-1
CASE OF "SKIN TONE REGION"

WHEN INCREASING SATURATION

WHEN DECREASING SATURATION

FIG. 11A-1

| CMYK COLOR SPACE | L*a*b* COLOR SPACE |
|---|---|
| C1,M1,Y1,K1 | L1*,a1*,b1* |
| C2,M2,Y2,K2 | L2*,a2*,b2* |
| C3,M3,Y3,K3 | L3*,a3*,b3* |
| C4,M4,Y4,K4 | L4*,a4*,b4* |
| C5,M5,Y5,K5 | L5*,a5*,b5* |
| ⋮ | ⋮ |

FIG. 11A-2

| CMYK COLOR SPACE | L*a*b* COLOR SPACE |
|---|---|
| C1,M1,Y1,K1 | L1*,a1*,b1* |
| C2,M2,Y2,K2 | L2*,a2*,b2* |
| C3,M3,Y3,K3 | L3*,a3*,b3* |
| C5,M5,Y5,K5 | L5*,a5*,b5* |
| ⋮ | ⋮ |

FIG. 11B

| L*a*b* COLOR SPACE | WEIGHTING COEFFICIENT (SATURATION) | WEIGHTING COEFFICIENT (LIGHTNESS) |
|---|---|---|
| L1*,a1*,b1* | WS1 | WL1 |
| L2*,a2*,b2* | WS2 | WL2 |
| L3*,a3*,b3* | WS3 | WL3 |
| L5*,a5*,b5* | WS5 | WL5 |
| ⋮ | ⋮ | ⋮ |

FIG. 11C

| L*a*b* COLOR SPACE | C | M | Y | K |
|---|---|---|---|---|
| L1*,a1*,b1* | LUT(-) | LUT(+) | LUT(+) | LUT(-) |
| L2*,a2*,b2* | LUT(+) | LUT(-) | LUT(-) | LUT(-) |
| L3*,a3*,b3* | LUT(-) | LUT(+) | LUT(-) | LUT(-) |
| L5*,a5*,b5* | LUT(0) | LUT(+) | LUT(-) | LUT(-) |
| ⋮ | ⋮ | ⋮ | ⋮ | ⋮ |

FIG. 11D

| L*a*b* COLOR SPACE | CMYK COLOR SPACE | VALUE AFTER ADJUSTMENT |
|---|---|---|
| L1*,a1*,b1* | C1,M1,Y1,K1 | C1',M1',Y1',K1' |
| L2*,a2*,b2* | C2,M2,Y2,K2 | C2',M2',Y2',K2' |
| L3*,a3*,b3* | C3,M3,Y3,K3 | C3',M3',Y3',K3' |
| L4*,a4*,b4* | C4,M4,Y4,K4 | C4,M4,Y4,K4 |
| L5*,a5*,b5* | C5,M5,Y5,K5 | C5',M5',Y5',K5' |
| ⋮ | ⋮ | ⋮ |

C1' = OUTPUT VALUE OF LUT (-) WHEN C1 IS INPUT VALUE × WS1 × WL1
M1' = OUTPUT VALUE OF LUT (+) WHEN M1 IS INPUT VALUE × WS1 × WL1
Y1' = OUTPUT VALUE OF LUT (+) WHEN Y1 IS INPUT VALUE × WS1 × WL1
K1' = OUTPUT VALUE OF LUT (-) WHEN K1 IS INPUT VALUE × WS1 × WL1
C2' = OUTPUT VALUE OF LUT (+) WHEN C2 IS INPUT VALUE × WS2 × WL2
⋯

FIG. 12A

| C | M | Y |
|---|---|---|
| LUT(-) | LUT(+) | LUT(+) |

FIG. 12B

| L*a*b* COLOR SPACE | CMYK COLOR SPACE | VALUE AFTER ADJUSTMENT |
|---|---|---|
| L1*,a1*,b1* | C1,M1,Y1,K1 | C1',M1',Y1',K1 |
| L2*,a2*,b2* | C2,M2,Y2,K2 | C2',M2',Y2',K2 |
| L3*,a3*,b3* | C3,M3,Y3,K3 | C3',M3',Y3',K3 |
| L5*,a5*,b5* | C5,M5,Y5,K5 | C5',M5',Y5',K5 |
| ⋮ | ⋮ | ⋮ |

C1' = OUTPUT VALUE OF LUT (-) WHEN C1 IS INPUT VALUE × WS1 × WL1
M1' = OUTPUT VALUE OF LUT (+) WHEN M1 IS INPUT VALUE × WS1 × WL1
Y1' = OUTPUT VALUE OF LUT (+) WHEN Y1 IS INPUT VALUE × WS1 × WL1
K1' = OUTPUT VALUE OF LUT (-) WHEN K1 IS INPUT VALUE × WS1 × WL1
C2' = OUTPUT VALUE OF LUT (-) WHEN C2 IS INPUT VALUE × WS2 × WL2
M2' = OUTPUT VALUE OF LUT (+) WHEN M2 IS INPUT VALUE × WS2 × WL2
⋯
⋯

FIG. 14A

COLOR CONVERSION TABLE BEFORE BEING CHANGED

| RGB COLOR SPACE | CMYK COLOR SPACE |
|---|---|
| R1,G1,B1 | C1,M1,Y1,K1 |
| R2,G2,B2 | C2,M2,Y2,K2 |
| R3,G3,B3 | C3,M3,Y3,K3 |
| R4,G4,B4 | C4,M4,Y4,K4 |
| R5,G5,B5 | C5,M5,Y5,K5 |
| ⋮ | ⋮ |

FIG. 14B

COLOR CONVERSION TABLE AFTER BEING CHANGED

| RGB COLOR SPACE | CMYK COLOR SPACE |
|---|---|
| R1,G1,B1 | C1',M1',Y1',K1' |
| R2,G2,B2 | C2',M2',Y2',K2' |
| R3,G3,B3 | C3',M3',Y3',K3' |
| R4,G4,B4 | C4,M4,Y4,K4 |
| R5,G5,B5 | C5',M5',Y5',K5' |
| ⋮ | ⋮ |

COLOR ADJUSTMENT DEVICE, IMAGE FORMING APPARATUS, AND COMPUTER READABLE MEDIUM

CROSS-REFERENCE TO RELATED APPLICATION

This application is based on and claims priority under 35 USC 119 from Japanese Patent Application No. 2010-249224 filed on Nov. 5, 2010.

BACKGROUND (i) Technical Field

The present invention relates to a color adjustment device, an image forming apparatus, and a computer readable medium.

(ii) Related Art

Color image forming systems such as digital color copiers, computer printers, and network printers have an image processing device having a color conversion function which converts a color space of an image input device or image input signal into a color space of an image forming apparatus (image output device). However, there is a case that output colors reproduced by above color conversion function corresponding to an input original image or input image signal are different from colors desired by user. Hence, various color adjustment methods are proposed to reproduce the color desired by user.

SUMMARY

According to an aspect of the present invention, there is provided a color adjustment device including: a conversion unit that converts color values of a second color space stored in a color conversion table, which defines a correspondence relation between color values of a first color space and color values of the second color space, into color values of a third color space independent from a device outputting an image; a storage unit that stores tables that define different input-output characteristics depending on color values of the third color space; and a change unit that selects at least one table from the tables according to a specified adjustment method, and executes a change process that changes color values of the second color space stored in the color conversion table by using the at least one table.

BRIEF DESCRIPTION OF THE DRAWINGS

Exemplary embodiments of the present invention will be described in detail based on the following figures, wherein:

FIG. 5A-1 through FIG. 5C-2 are diagrams illustrating weighting functions that define a relation between a saturation and a weight coefficient in the L*a*b* color space with respect to each adjustment region;

FIGS. 11A-1 through 11D are diagrams illustrating tangible data used in the process illustrated in FIG. 10;

FIGS. 12A and 12B are diagrams illustrating tangible data used in the process illustrated in FIG. 10;

FIGS. 14A and 14B are diagrams illustrating a color conversion table before being changed and a color conversion table after being changed.

DETAILED DESCRIPTION

A description will now be given, with reference to the accompanying drawings, of an exemplary embodiment of the present invention.

Figure 1:
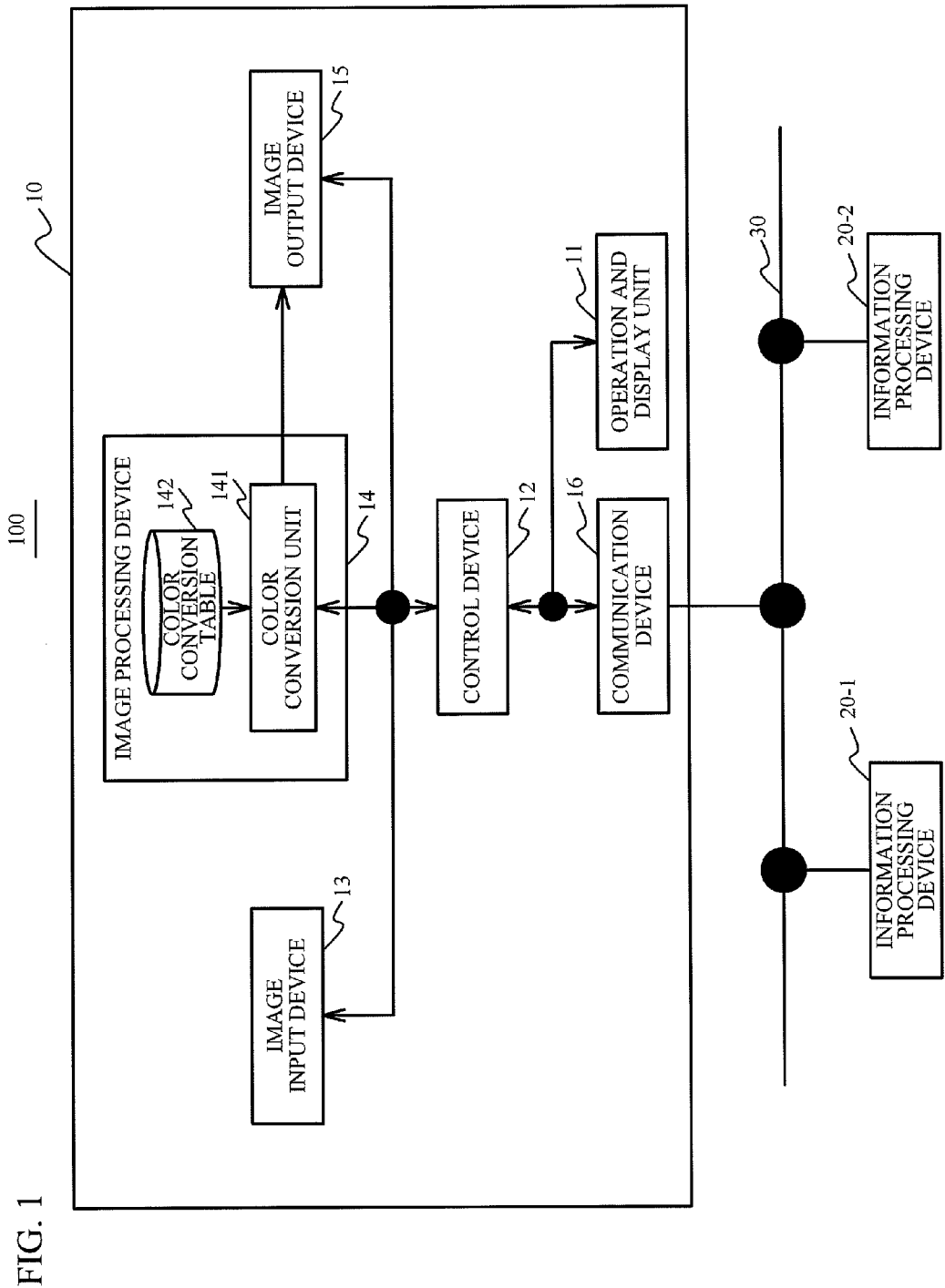
FIG. 1 is a diagram illustrating a system configuration of an image forming system in accordance with an exemplary embodiment.

FIG. 1 is a diagram illustrating a configuration of an image forming system 100 in accordance with an exemplary embodiment. The image forming system 100 is provided with an image forming apparatus 10, an information processing device 20-1, and an information processing device 20-2.

The image forming apparatus 10, and information processing devices 20-1 and 20-2 are connected each other by a communication unit 30 such as LAN (Local Area Network) and WAN (Wide Area Network) so as to communicate each other.

Information processing apparatuses 20-1 and 20-2 transmit data for image forming to the image forming apparatus 10. In addition, at least one of information processing devices 20-1 and 20-2 functions as a color adjustment device. Functions as the color adjustment device provided to the information processing device 20 will be described later. Hereinafter, the information processing device 20-1 and the information processing device 20-2 are referred to as an information processing device 20 except a case to be distinguished from each other.

The image forming apparatus 10 is provided with an operation and display unit 11, a control device 12, an image input device 13, an image processing device 14, an image output device 15, and a communication device 16.

The operation and display unit 11 displays an operation screen for receiving an operational input to the image forming apparatus 10 from a user based on the control by the control device 12. The operation and display unit 11 receives instructions to the image forming apparatus 10 from a user through the operation screen. The operation and display unit 11 outputs instruction information indicating instructions to the image forming apparatus 10 received from a user through the operation screen to the control device 12.

The control device 12 controls behaviors of the image forming apparatus 10. More specifically, the control device 12 controls the operation and display unit 11 to display the operation screen on the operation and display unit 11. The control device 12 receives instruction information to the image forming apparatus 10 from the operation and display unit 11.

The control device 12 controls the image input device 13, the image processing device 14, the image output device 15, and the communication device 16 provided to the image forming apparatus 10 according to received instruction information. For example, when instruction information ordering a scan of an image is received from the operation and display unit 11, the control device 12 controls the image input device 13 to read an original document placed on a platen, and acquire an original document image. When instruction information ordering a copy is received from the operation and display unit 11, the control device 12 controls the image input device 13 to read an original document placed on a platen, and acquire an original document image. Then, the control device 12 controls the image processing device 14 to convert data of the original document image into image data capable of being processed by the image output device 15. Then, the control device 12 controls the image output device 15 to form the image on a recording medium such as paper based on the converted image data, and output it.

When instruction information ordering a transmission of FAX (facsimile) is received from the operation and display unit 11, the control device 12 controls the image input device 13 to read a document to be transmitted placed on a platen, and acquire a document image. Then, the control device 12 controls the communication device 16 to transmit the acquired document image to specified destination at the operation and display unit 11.

The image input device 13 is a scanner for example, reads an original document placed on a platen and outputs the read original document image to the control device 12 based on the control by the control device 12.

The image processing device 14 converts image data of an original document image inputted from the control device 12 into image data capable of being processed by the image output device 15, and outputs it to the image output device 15 based on the control by the control device 12. More specifically, the image processing device 14 includes a color conversion unit 141 and a conversion table storing unit 142.

The color conversion unit 141 converts image data of an original document image expressed by the RGB color space into image data expressed by the CMYK color space capable of being processed by the image output device 15 by using a multidimensional lookup table (color conversion table) stored in the conversion table storing unit 142 for example. Here, the color conversion table is a multidimensional lookup table that defines a correspondence relation between values of two color spaces. For example, it defines a correspondence relation between values in the RGB color space and values in the CMYK color space.

The conversion table storing unit 142 stores a number of color conversion tables to respond to various image forming requests (for example, a color conversion table which emphasizes gradation, a color conversion table for achieving a consistency of color with a printed target, and the like). The color conversion unit 141 selects a color conversion table used for a color conversion from color conversion tables stored in the conversion table storing unit 142 based on the instruction from the control device 12, and carries out a color conversion.

The image output device 15 receives image data from the image processing device 14. The image output device 15 forms an image on a recording medium such as paper by using received image data and outputs it based on a control by the control device 12.

The communication device 16 transmits a document image to be transmitted to the destination specified in the operation and display unit 11 based on the control by the control device 12. In addition, the communication device 16 receives image data for image forming from information processing devices 20-1 and 20-2, and output it to the control device 12. Moreover, the communication device 16 receives data relating to a color adjustment described later from information processing devices 20-1 and 20-2, and outputs it to the control device 12.

Figure 2:
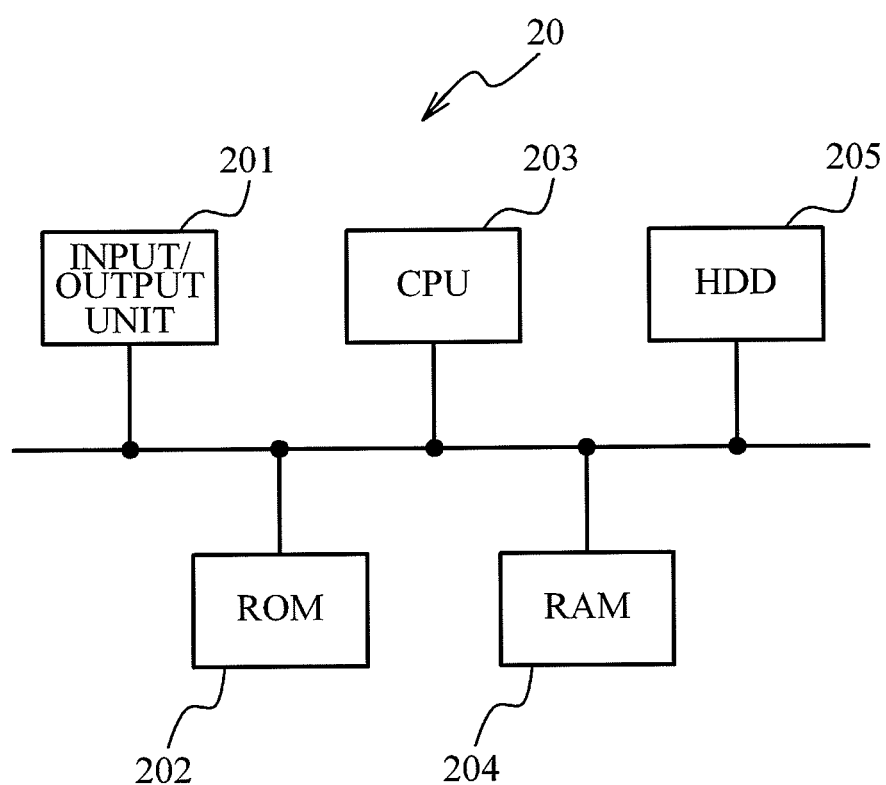
FIG. 2 is a diagram illustrating a hardware structure of an information processing device.

A description will now be given of an example of a hardware structure of the information processing device 20 functioning as the color adjustment device. FIG. 2 is a diagram illustrating a hardware structure of the information processing device 20.

The information processing device 20 is provided with an input/output unit 201, a ROM (Read Only Memory) 202, a CPU (Central Processing Unit) 203, a RAM (Random Access Memory) 204, and an HDD (Hard Disk Drive) 205.

The input/output unit 201 receives/transmits data from/to the image forming apparatus 10. The ROM 202 stores programs for executing a color adjustment (a detail will be described later). The CPU 203 reads and executes programs stored in the ROM 202. The RAM 204 stores temporary data used during the execution of programs. The HDD 205 stores various data used for the color adjustment.

Figure 3:
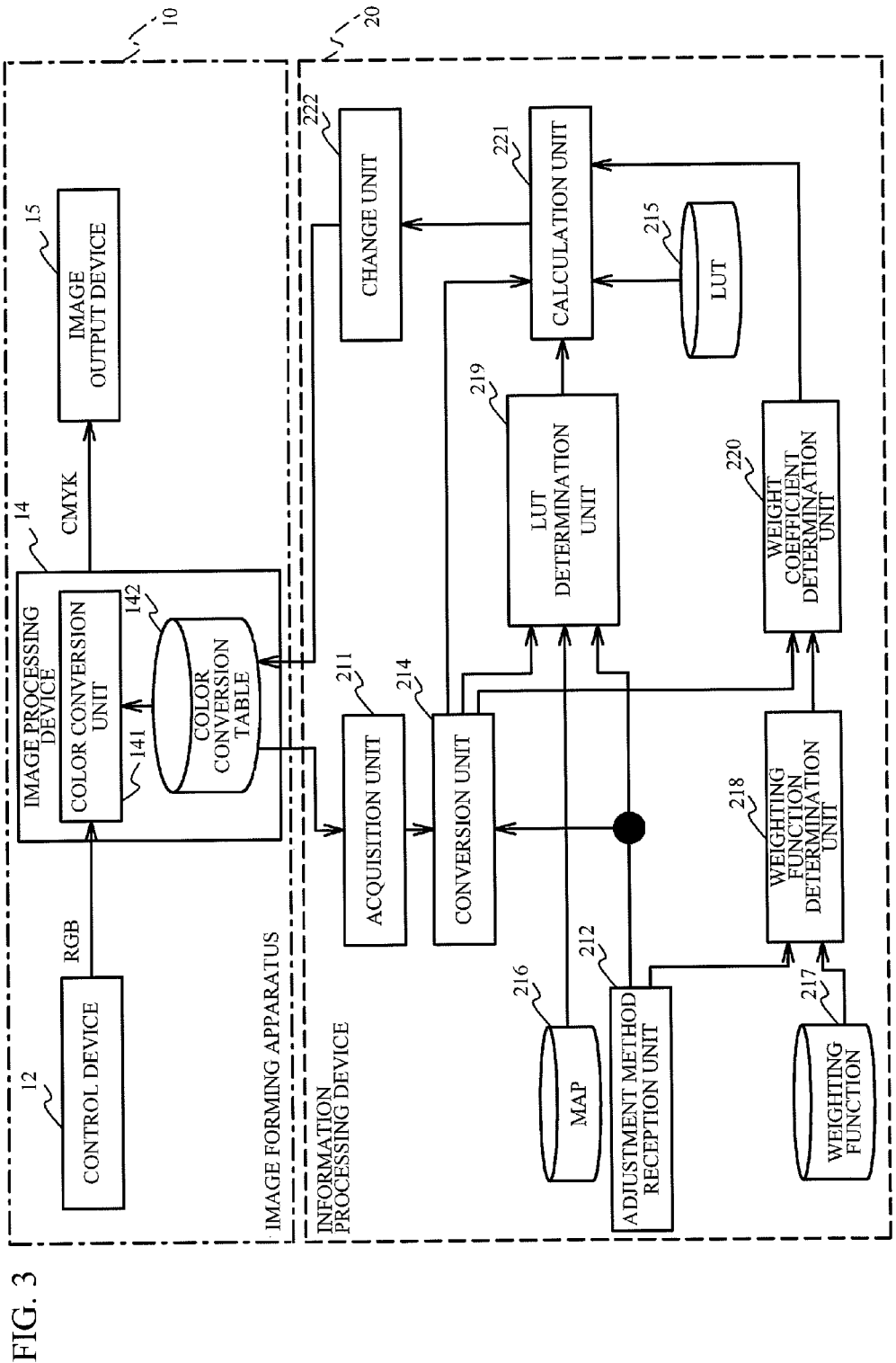
FIG. 3 is a functional diagram illustrating functions provided to the information processing device.

A description will now be given of functions provided to the information processing device 20 as the color adjustment device. FIG. 3 is a functional block diagram illustrating functions provided to the information processing device 20. The information processing device 20 includes an acquisition unit 211, a conversion unit 214, an adjustment method reception unit 212, a weighting function determination unit 218, an LUT determination unit 219, a weight coefficient determination unit 220, a calculation unit 221, and a change unit 222. The acquisition unit 211, the conversion unit 214, the adjustment method reception unit 212, the weighting function determination unit 218, the LUT determination unit 219, the weight coefficient determination unit 220, the calculation unit 221, and the change unit 222 are achieved by execution of programs stored in the ROM 202 by the CPU 203.

The information processing device 20 further includes an LUT storing unit 215, a map storing unit 216, and a weighting function storing unit 217. The LUT storing unit 215, the map storing unit 216, and the weighting function storing unit 217 are the HDD 205 for example, and correspond to a storage unit.

The acquisition unit 211 acquires the color conversion table to be subject to a color adjustment from the conversion table storing unit 142 provided to the image processing device 14. The acquisition of the color conversion table held in the image processing device 14 is carried out via the communication device 16 and the control device 12, but for simplification, in FIG. 3, it is illustrated that the acquisition unit 211 acquires the color conversion table from the conversion table storing unit 142. In a following description, assume that the color conversion table is a multidimensional lookup table that defines correspondence relations between color values of the RGB color space (first color space) and color values of the CMYK color space (second color space). However, the color conversion table may be a multidimensional lookup table that defines correspondence relations between color values of the CMYK color space and color values of the CMYK color space for example. The acquisition unit 211 outputs the acquired color conversion table to the conversion unit 214.

The adjustment method reception unit 212 receives a specification of a method of color adjustment (adjustment method) from a user. More specifically, the adjustment method reception unit 212 receives an adjustment instruction for at least one of the lightness, the saturation and the color balance. The instruction for the lightness is an instruction for increasing or decreasing the lightness, and the instruction for the saturation is an instruction for increasing or decreasing the saturation. Moreover, the instruction for the color balance is an instruction for indicating a color direction to which the color balance is shifted and its strength.

In addition, the adjustment method reception unit 212 receives a specification of a color region (adjustment region), to which the color adjustment is carried out, from a user. There are a whole region, a gray region, and a skin tone region, as an adjustment region for example. It is possible not to receive a specification of the adjustment region, and a whole region may be always subject to a color adjustment. In addition, an adjustment region may be determined by the type of the color conversion table to which a color adjustment is carried out.

Figure 4:
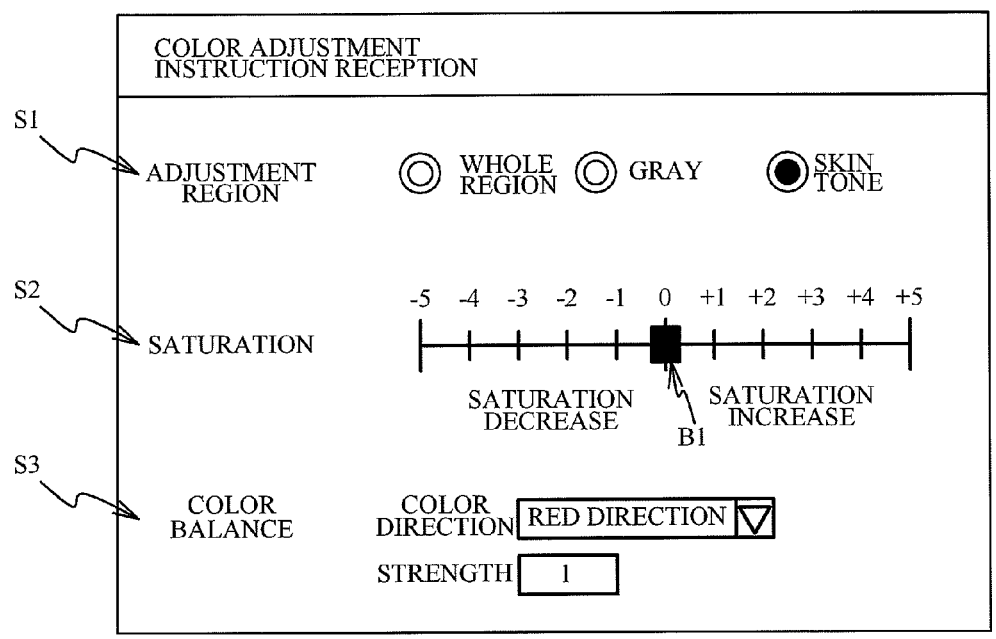
FIG. 4 illustrates a color adjustment instruction reception screen for receiving a specification of an adjustment region and an adjustment instruction for at least one of saturation and color balance.

The adjustment method reception unit 212 receives an instruction relating to an adjustment method from a user via a screen illustrated in FIG. 4 and presented on a display provided with the information processing device 20, for example. FIG. 4 illustrates a color adjustment instruction reception screen which receives an adjustment region and a specification of at least one of the saturation and the color balance from a user.

In FIG. 4, the color adjustment instruction reception screen includes a part S1 that receives a specification of the adjustment region, a part S2 that receives the adjustment instruction for the saturation, and a part S3 that receives the adjustment instruction for the color balance. In the part S1 that receives an specification of the adjustment region, the adjustment region can be selected from "whole region", "gray" and "skin tone" by radio button. In the part S2 that receives the adjustment instruction for the saturation, the increase or decrease of the saturation and its degree can be specified by sliding a bar B1. In the part S3 that receives the adjustment instruction for the color balance, a color direction to which the color balance is shifted, and its strength can be input.

Returning to FIG. 3, a description will be continued. The adjustment method reception unit 212 outputs adjustment instructions of the saturation and the color balance to the LUT determination unit 219. In addition, the adjustment method reception unit 212 outputs the specified adjustment region to the conversion unit 214 and the weighting function determination unit 218.

The conversion unit 214 receives the color conversion table to be subject to the color adjustment from the acquisition unit 211. The conversion unit 214 receives the specified adjustment region from the adjustment method reception unit 212. The conversion unit 214 converts color values of the CMYK color space stored in the received color conversion table into color values of the L*a*b* color space (third color space) that is a device-independent color space. The color space of conversion destination is not limited to the L*a*b* color space, and may be any of color spaces that are device-independent color spaces. The conversion unit 214 outputs data that stores the combination of color values of the CMYK color space with color values of the L*a*b* color space to the LUT determination unit 219, the weight coefficient determination unit 220, and the calculation unit 221. The color values of the CMYK color space stored in the data is stored in the received color conversion table, and is within the adjustment region. The color values of the L*a*b* color space are converted from the color values of the CMYK color space store in the received color conversion table.

The weighting function storing unit 217 stores weighting functions of which weight coefficients vary in response to color values of third color space with respect to each adjustment region. More specifically, weighting functions each of which defines a relation between the saturation in the L*a*b* color space and the weight coefficient, and a weighting function that defines a relation between the lightness in the L*a*b* color space and the weight coefficient are stored. Examples of weighting functions with respect to each adjustment region are illustrated in FIG. 5A-1 through FIG. 5C-2. FIG. 5A-2, FIG. 5B-2, and FIG. 5C-2 illustrate weighting functions that defines a relation between the saturation in the L*a*b* color space and the weight coefficient with respect to each adjustment region. In FIG. 5A-1, FIG. 5B-1 and FIG. 5C-1, the region enclosed by a solid line means a region where a* value and b* value calculated by the conversion unit 214 are included.

FIGS. 5A-1 and 5A-2 illustrate a case where the adjustment region is "whole region". When the adjustment region is "whole region", as illustrated in FIG. 5A-1, all of the region where a* value and b* value are included is subject to the color adjustment. FIG. 5A-2 illustrates a weighting function used for the determination of the weight coefficient when the adjustment region is "whole region". In the exemplary embodiment, as illustrated in FIG. 5A-2, when the adjustment region is "whole region", the weight coefficient is 1 regardless of the saturation.

FIGS. 5B-1 and 5B-2 illustrate a case where the adjustment region is "gray region". When the adjustment region is "gray region", records having a combination of a* value and b* value both of which are included in the region indicated by hatching in FIG. 5B-1 are subject to the color adjustment. FIG. 5B-2 illustrates the weighting function used for the determination of the weight coefficient when the adjustment region is "gray region". In the exemplary embodiment, the weight coefficient becomes small as the distance from an original point (the saturation) becomes long, and when the distance calculated from a* value and b* value is not included in the region indicated by hatching, the weight coefficient becomes 0.

FIGS. 5C-1 and 5C-2 illustrate a case where the adjustment region is "skin tone region". When the adjustment region is "skin tone region", records having a combination of a* value and b*value both of which are included in the region indicated by hatching in FIG. 5C-1 are subject to the color adjustment. FIG. 5C-2 illustrates the weighting function used for the determination of the weight coefficient when the adjustment region is "skin tone region". As illustrated in FIG. 5C-2, in a case where the adjustment region is "skin tone region", the weight coefficient becomes small as the saturation increases when a hue angle is between 0 and 100 degrees. Then, when a* value and b* value are not included in the region indicated by hatching, which means that the hue angle becomes between 100 and 360 degrees, the weight coefficient becomes 0.

A range of "gray region" on the a*b* plane illustrated in FIG. 5B-1 is not limited to the present exemplary embodiment. In the present exemplary embodiment, "gray region" is illustrated by a circle, but the "gray region" may be a region enclosed by an ellipsoid or a polygon. In addition, the range of "skin tone region" on the a*b* plane illustrated in FIG. 5C-1 is not limited to the present exemplary embodiment. The range of a* value and b* value corresponding to "gray region" and "skin tone region" may be set arbitrary.

Figure 6:
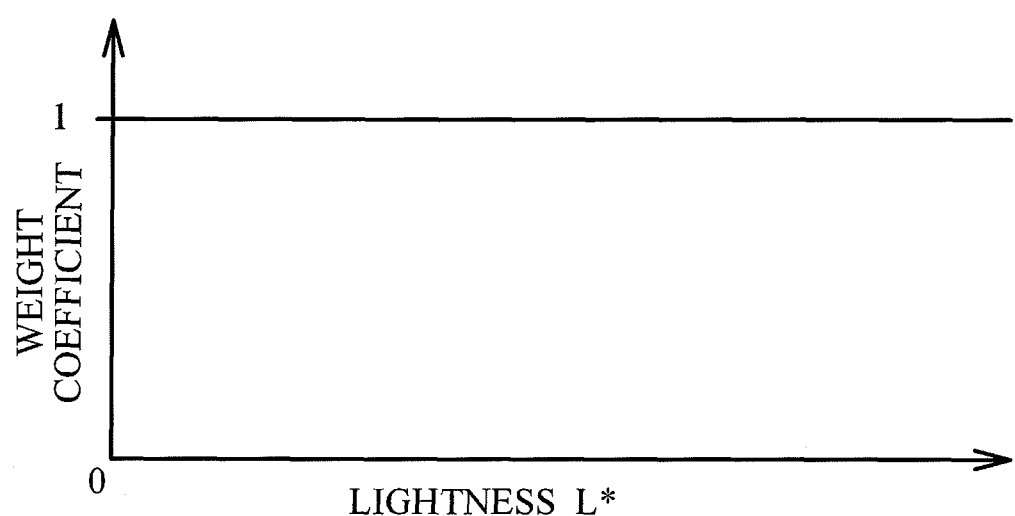
FIG. 6 is a diagram illustrating a weighting function that defines a relation between a lightness and a weight coefficient.

FIG. 6 illustrates the weighting function that defines a relation between the lightness (L*) and the weight coefficient. In the present exemplary embodiment, the weighting function illustrated in FIG. 6 is used for the color adjustment of the lightness regardless of the adjustment region.

Back to FIG. 3, a description will be given. The weighting function determination unit 218 receives the adjustment region from the adjustment method reception unit 212. The weighting function determination unit 218 determines the weighting function used for the color adjustment from weighting functions stored in the weighting function storing unit 217 on the basis of the received adjustment region. For example, when the adjustment region received from the adjustment method reception unit 212 is "gray region" for example, the weighting function determination unit 218 determines the weighting function illustrated in FIG. 5B-2, and the weighting function illustrated in FIG. 6 as weighting functions used for the color adjustment. The weighting function determination unit 218 outputs determined weighting functions to the weight coefficient determination unit 220.

The weight coefficient determination unit 220 receives data storing a combination of color values of the CMYK color space and color values of the L*a*b* color space, into which color values of the CMYK color space are converted, from the conversion unit 214. In addition, the weight coefficient determination unit 220 receives weighting functions used for the color adjustment from the weighting function determination unit 218.

The weight coefficient determination unit 220 acquires the weight coefficient for the saturation (hereinafter, referred to as "a the weight coefficient (saturation)") by using a* value and b* value from color values of the L*a*b* color space included in data received from the conversion unit 214. The weight coefficient determination unit 220 acquires the weight coefficient for the lightness (hereinafter, referred to as "a weight coefficient (lightness)") by using L* value. As described above, the weighting function determined by the weighting function determination unit 218 varies in response to the specified adjustment region, and the weight coefficient calculated from the weighting function varies in response to color values of the L*a*b* color space. This means that the weight coefficient used for the color adjustment varies in response to the specified adjustment region and color values of the L*a*b* color space.

The weight coefficient determination unit 220 outputs the weight coefficient (saturation) and the weight coefficient (lightness) to the calculation unit 221.

Figure 7A:
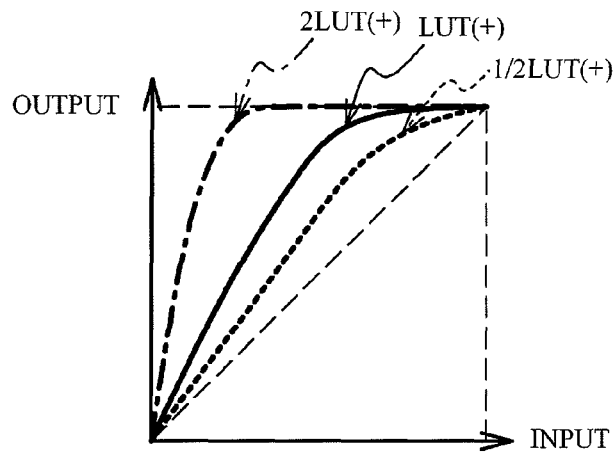
FIG. 7A through FIG. 7C are diagrams illustrating one-dimensional lookup tables used for the color adjustment.
Figure 7B:
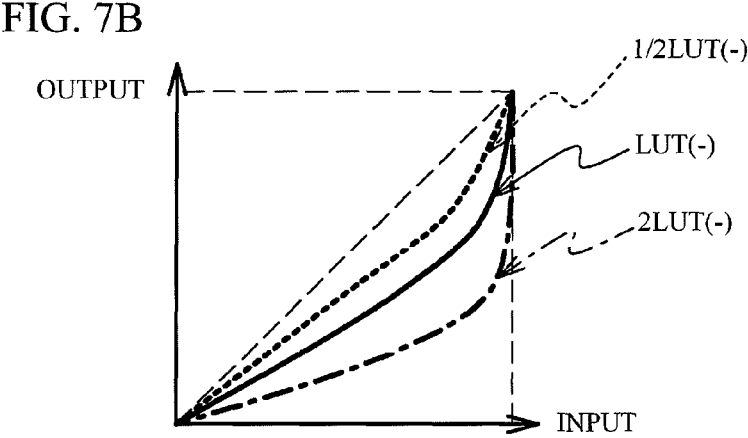
Figure 7C:
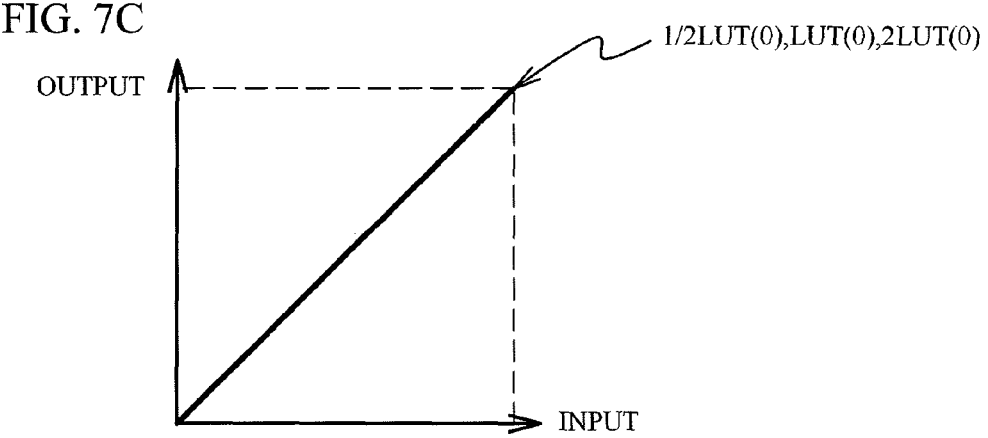

The LUT storing unit 215 stores a one-dimensional lookup table (LUT) that is used for the color adjustment and defines a relation between the input value and the output value. FIGS. 7A through 7C are diagrams illustrating one-dimensional lookup tables used for the color adjustment. For example, the LUT storing unit 215 stores an LUT illustrated in FIG. 7A where the output value becomes larger than the input value, an LUT illustrated in FIG. 7B where the output value becomes larger than the input value, and an LUT illustrated in FIG. 7C where the output value becomes equal to the input value. A 2LUT(+), an LUT(+), and a 1/2LUT(+) illustrated in FIG. 7A are examples of the LUT where the output value becomes larger than the input value. In addition, a 1/2LUT(−), an LUT(−), and a 2LUT(−) illustrated in FIG. 7B are examples of the LUT where the output value becomes smaller than the input value. Furthermore, a 1/2LUT(0), an LUT(0), and a 2LUT(0) illustrated in FIG. 7C are examples of the LUT where the output value becomes equal to the input value.

Figure 8A:
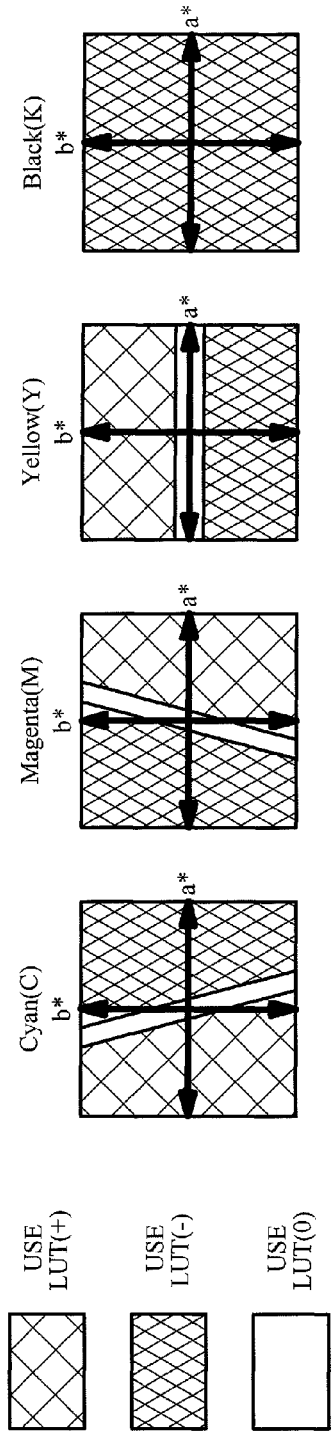
FIGS. 8A and 8B are diagrams illustrating maps for determining LUT used for the color adjustment according to the instruction for increasing or decreasing the saturation.
Figure 8B:
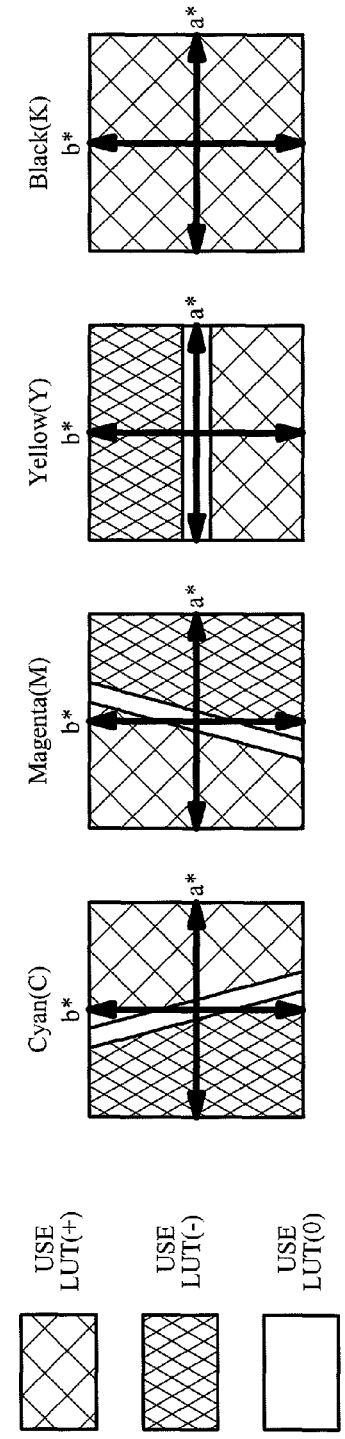

The map storing unit 216 stores maps for determining the LUT used for the color adjustment with respect to each color element of color values of the CMYK color space according to the instruction for increasing or decreasing the saturation. FIGS. 8A and 8B illustrate maps for determining the LUT used for the color adjustment according to the instruction for increasing or decreasing the saturation.

FIG. 8A illustrates maps used when the instruction for increasing the saturation is received, and FIG. 8B illustrates maps when the instruction for decreasing the saturation is received. In maps illustrated in FIGS. 8A and 8B, LUTs used for the color adjustment are defined on the a*b* plane with respect to each color element of color values of the CMYK color space. In FIGS. 8A and 8B, the region indicated by rough hatching represents the region where the LUT(+) is used for the color adjustment. This means that when a* value and b* value are included in the region illustrated with rough hatching, the LUT used for the color adjustment becomes LUT(+). In addition, the region illustrated with fine hatching represents a region where the LUT(−) is used for the color adjustment. Furthermore, the region without hatching represents a region where the LUT(0) is used for the color adjustment. The LUT used for the color adjustment on the basis of the content of the adjustment instruction is not limited to the present exemplary embodiment. In FIGS. 8A and 8B, the region where the LUT(0) is used may be unnecessary. In addition, it is possible not to set the map for Black(K), and not to execute the color adjustment using the LUT to K value.

Figure 9:
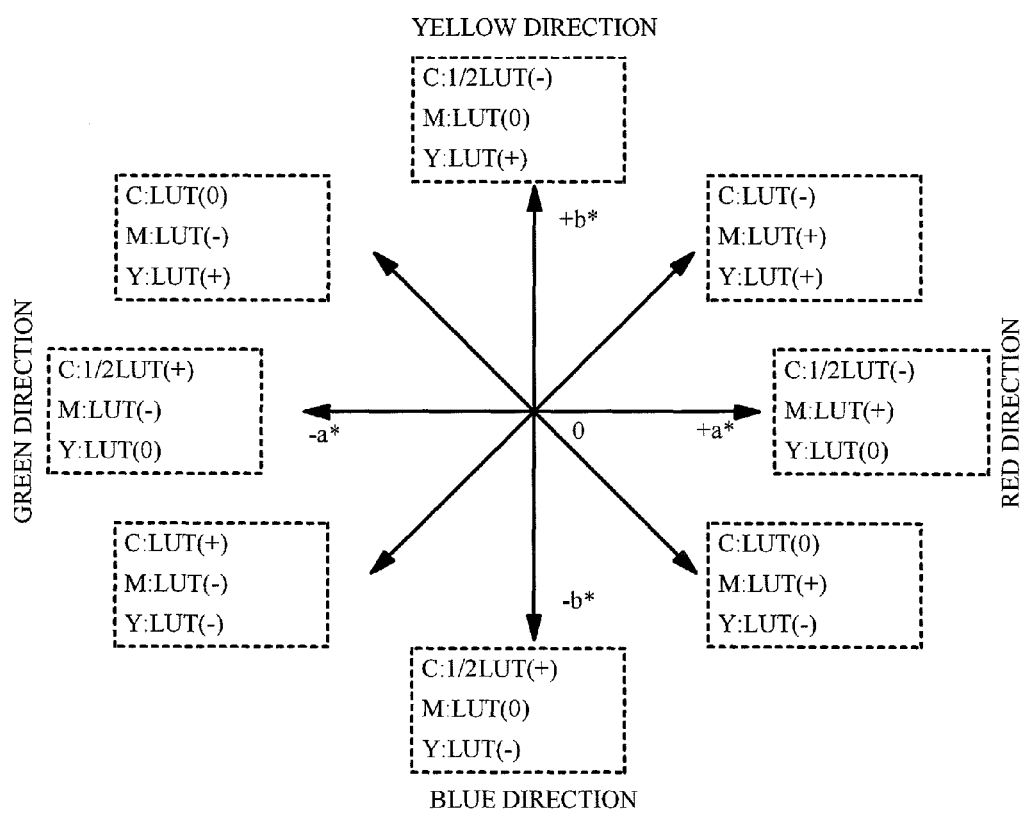
FIG. 9 is a diagram illustrating a map that defines a relation between a color direction to which the color balance is shifted and LUTs used for the color adjustment.

In addition, the map storing unit 216 stores maps that define a relation between the content of the adjustment instruction relating to the color balance and the LUT used for the color adjustment. FIG. 9 is a diagram illustrating a map that defines a relation between a color direction to which the color balance is shifted and the LUT used for the color adjustment.

In FIG. 9, the color direction received in the adjustment method reception unit 212 is related to the direction on the a*b* plane. LUTs used for the color adjustment are defined to color directions. For example, in FIG. 9, when the color balance is adjusted to the red direction, it is defined that the 1/2LUT(−) is used for the adjustment of C value, the LUT(+) is used for the adjustment of M value, and the LUT(0) is used for the adjustment of Y value.

The LUT determination unit 219 receives data storing a combination of color values of the CMYK color space and color values of L*a*b* color space, into which color values of the CMYK color space are converted, from the conversion unit 214. In addition, the LUT determination unit 219 receives the adjustment instruction for at least one of the saturation and the color balance from the adjustment method reception unit 212. Firstly, the LUT determination unit 219 selects a map from the map storing unit 216 on the basis of the adjustment instruction received from the adjustment method reception unit 212. For example, when the LUT determination unit 219 receives the instruction for increasing the saturation, it selects maps illustrated in FIG. 8A, and when it receives the instruction for decreasing the saturation, it selects maps illustrated in FIG. 8B. In addition, when it receives the adjustment instruction for the color balance, it selects a map illustrated in FIG. 9.

The LUT determination unit 219 determines LUTs used for the color adjustment with respect to each color element of color values of the CMYK color space on the basis of maps illustrated in FIG. 8A or 8B and a* value and b* value of each record included in data received from the conversion unit 214 when it receives the adjustment instruction for increasing or decreasing the saturation. The LUT determination unit 219 changes the LUT defined in the map based on the degree of increase or decrease of the saturation. For example, assume that the bar B1 is placed to the position of "+2" in the part S2 that receives the instruction for the adjustment of the saturation on the color adjustment instruction reception screen illustrated in FIG. 4. This means that the saturation is increased, and its degree is "2". In this case, the LUT determination unit 219 changes the LUT(+) or the LUT(−) defined in the map illustrated in FIG. 8A or 8B on the basis of the specified degree "2", and determines the 2LUT(+) or the 2LUT(−) as the LUT. As described above, the LUT used for the color adjustment is selected from LUTs in accordance with the adjustment instruction for increasing or decreasing the saturation.

When the LUT determination unit 219 receives the adjustment instruction for the color balance, it determines the LUT defined in the position corresponding to the specified color direction on the a*b* plane in FIG. 9 as the LUT used for the color adjustment. The LUT determination unit 219 modifies the LUT on the basis of the strength of the color direction (for example, a value from "1" to "5"). In the present exemplary embodiment, the LUT defined in FIG. 9 is a LUT used for the color adjustment when the strength is "1". When "red direction" and "2" are specified as the color direction and the strength respectively, the LUT determination unit 219 determines the LUT which is double of the LUT used when the intensity is "1" as the LUT used for the color adjustment. More specifically, the LUT(−), the 2LUT(+) and the 2LUT(0) are determined for C value, M value, and Y value respectively as LUTs used for the color adjustment. This means that the LUT used for the color adjustment is selected from LUTs according to the adjustment instruction for the color balance.

The LUT determination unit 219 outputs determined LUTs to the calculation unit 221.

The calculation unit 221 receives LUTs used for the color adjustment from the LUT determination unit 219. In addition, the calculation unit 221 receives the weight coefficient (saturation) and the weight coefficient (lightness) from the weight coefficient determination unit 220. The calculation unit 221 receives data storing a combination of color values of the CMYK color space and color values of L*a*b* color space, into which color values of the CMYK color space are converted, from the conversion unit 214.

The calculation unit 221 calculates new color values (C', M', Y', K') by multiplying the output values calculated from the input of color elements (C, M, Y and K) of color values of the CMYK color space into respective LUTs determined by the LUT determination unit 219 by the weight coefficient (saturation) and the weight coefficient (brightness) in each record. The calculation unit 221 outputs new calculated color values to the change unit 222.

The change unit 222 receives new color values from the calculation unit 221. The change unit 222 changes color values of the CMYK color space stored in the color conversion table acquired by the acquisition unit 211 with new color values calculated by the calculation unit 221 in the conversion table storing unit 142.

Figure 10:
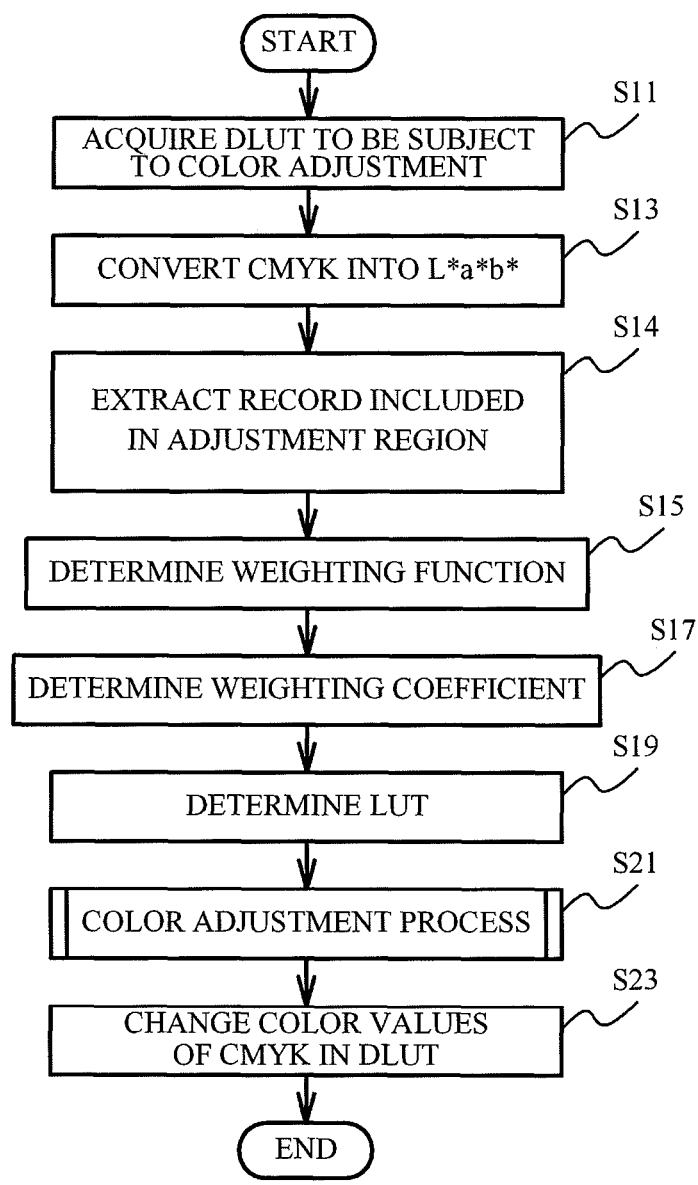
FIG. 10 is a flowchart illustrating a process executed by the information processing device.

A description will now be given of a process executed by the information processing device 20 by using a tangible example. FIG. 10 is a flowchart illustrating a process executed by the information processing device 20. FIG. 11A-1 through FIG. 12B are diagrams illustrating tangible data used in the process illustrated in FIG. 10. In the following description, assume that one of the adjustment instruction for the color balance and the adjustment instruction for the saturation is received.

The acquisition unit 211 acquires the color conversion table to be subject to the color adjustment from the conversion table storing unit 142 (step S11). In the present exemplary embodiment, assume that the acquisition unit 211 acquires the color conversion table specified by a user as the color conversion table to be subject to the color adjustment.

The conversion unit 214 converts color values of the CMYK color space stored in the color conversion table acquired by the acquisition unit 211 into color values of the L*a*b* color space (step S13). An example of data converted by the conversion unit 214 and transmitted to the LUT determination unit 219, the weight coefficient determination unit 220, and the calculation unit 221 is illustrated in FIG. 11A-1.

Then, the conversion unit 214 extracts records included in the range of the specified adjustment region from data indicating the correspondence relation between color values of the CMYK color space and color values of the L*a*b* color space (step S14). More specifically, the conversion unit 214 extracts records of which a* value and b* value of the L*a*b* color space are included in the specified adjustment region. In the exemplary embodiment, assume that a4* value and b4* value included in the fourth record in FIG. 11A-1 are not included in the range of the specified adjustment region. In this case, the conversion unit 214 transmits data illustrated in FIG. 11A-2 that does not include the fourth record illustrated in FIG. 11A-1 to the LUT determination unit 219, the weight coefficient determination unit 220, and the calculation unit 221.

Then, the weighting function determination unit 218 determines the weighting function based on the adjustment region received by the adjustment method reception unit 212 (step S15).

Then, the weight coefficient determination unit 220 determines the weight coefficient by using the weighting function determined in the step S15 (step S17). More specifically, the weight coefficient determination unit 220 determines the weight coefficient (saturation) by using a* value and b* value, and determines the weight coefficient (lightness) by using L* value with respect to each record received from the conversion unit 214. For example, as illustrated in FIG. 11B, the weight coefficient determination unit 220 determines the weight coefficient (saturation) and the weight coefficient (lightness) to each record. In FIG. 11B, the weight coefficient (saturation) and the weight coefficient (lightness) may take same values in different records. For example, WS1 may be equal to WS3.

Then, the LUT determination unit 219 determines the LUT used for the adjustment of color values of the CMYK color space based on the content of the adjustment instruction received by the adjustment method reception unit 212 (step S19). More specifically, the LUT determination unit 219 determines maps used for determining the LUT based on the content of the adjustment instruction. For example, when the adjustment instruction for increasing the saturation is received, the LUT determination unit 219 acquires the LUT assigned to the region where a* value and b* value of each record are included. As a result, as illustrated in FIG. 11C, LUTs used for the color adjustment are determined with respect to each color element of color values of the CMYK color space to each record. Moreover, when the adjustment instruction for the color balance is received, as illustrated in FIG. 12A, LUTs used for the color adjustment are determined with respect to each color element of color values of the CMYK color space instead of each record.

Figure 13:
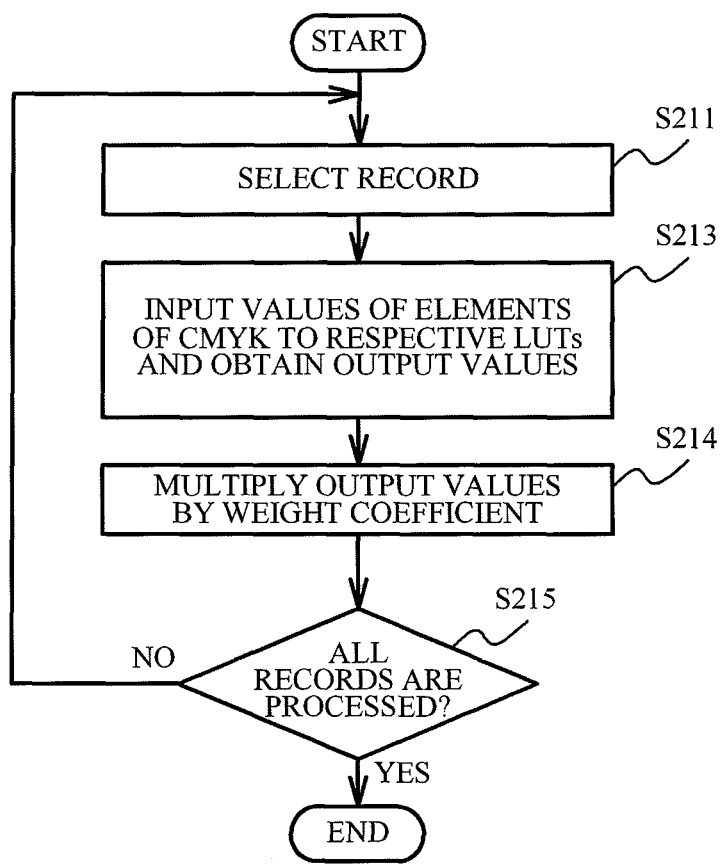
FIG. 13 is a flowchart illustrating a color adjustment process.

Then, the calculation unit 221 executes a color adjustment process (step S21). Here, a description will be given of a detail of the color adjustment process. FIG. 13 is a flowchart illustrating a color adjustment process.

The calculation unit 221 selects a record from data storing a combination of color values of the L*a*b* color space received from the conversion unit 214 and color values of the CMYK color space (step S211).

Then, the calculation unit 221 inputs color elements (e.g. C1, M1, Y1, K1) of color values of the CMYK color space stored in the record to respective LUTs determined by the LUT determination unit 219, and obtains output values (step S213). The calculation unit 221 multiplies obtained output values by weight coefficients determined in the step S17 of FIG. 10, and adjusts C value, M value, Y value and K value (step S214).

Then, the calculation unit 221 determines whether all records are processed (step S215). When all records are not processed (step S215/NO), the calculation unit 221 selects the next record (step S211), and executes procedures from the step S212. When all records are processed (step S215/YES), the calculation unit 221 ends the color adjustment process.

As illustrated in FIG. 11D and FIG. 12D, data including a combination of color values of the CMYK color space stored in the current color conversion table and color values adjusted in the step S214 (values after adjustment) is created with the process illustrated in FIG. 13. In FIG. 11D, color values after the adjustment corresponding to color values of the CMYK color space stored in the current color conversion table (C1, M1, Y1, K1) become (C1', M1', Y1', K1'). The color adjustment process is not executed to records not included in the adjustment region.

This means that the color adjustment is not executed to color values (C4, M4, Y4, K4) of the CMYK color space stored in the color conversion table, and the values after the adjustment remain (C4, M4, Y4, K4) (see FIG. 11D).

As illustrated in FIG. 12D, when the color balance is adjusted, the adjustment is not carried out to K value, K value of the CMYK color space stored in the current color conversion table and K value after adjustment become a same value.

Returning to FIG. 10, a description will be continued. The change unit 222 changes color values stored in the color conversion table with color values after adjustment (step S23), and ends the process. As a result, color values of the CMYK color space stored in the color conversion table before being changed illustrated in FIG. 14A are changed with color values after adjustment as illustrated in FIG. 14B. The procedures from the step S15 to the step S23 correspond to the change process.

There are image processing devices of related arts that execute a color adjustment process by converting the input RGB image into a virtual color space, and converting the image data of the virtual color space into the image in Lab which is a color space for the color adjustment. The Lab image to which the color adjustment process is executed is converted into the CMYK image of the output space, and transmitted to the image output device. Thus, according to above image processing devices of related arts, the difference between the color gamut of color space for the color adjustment and the color gamut of output color space is reduced, but the calculation amount for the color conversion increases. In addition, the amount of color material of black does not result in the adjustment result that a user desires by only an adjustment in the Lab space.

There are image processing methods of related arts that execute the color adjustment in the HSL space, generate a printer profile by converting the adjusted HL'S space into RGB, and use it for a color conversion. Furthermore, there are other image processing devices of related arts that adjust the lightness, the saturation, and the hue to the color input signal by using a matrix conversion. Therefore, according to above image processing methods or above other image processing devices of related arts, the calculation amount for the color conversion also increases because the color adjustment is carried out in the color conversion. In addition, as the color space to which the adjustment is carried out is a device-dependent color space, and the color conversion table used for the color conversion is nonlinear, there is a case that the adjustment result becomes the one that the user did not intend.

Furthermore, it may be considered to create a color conversion table that defines a correspondence relation between the RGB color space and the CMYK color space by converting the RGB color space into the L*a*b* color space which is a device-independent color space, executing the color adjustment to the L*a*b* color space, and converting the adjusted L*'a*'b*' color space into the CMYK color space. However, in this case, it is not easy to convert the L'*a'*b'* color space to the CMYK color space.

On the other hand, according to the above exemplary embodiment, the conversion unit 214 converts color values of the CMYK color space stored in the color conversion table that defines a correspondence relation between color values of the RGB color space and color values of the CMYK color space into color values of the L*a*b* color space which is a device-independent color space. Then, the change unit 222 selects at least one LUT from LUTs defining different input-output characteristics in response to the specified adjustment method, and executes the change process that changes color values of the CMYK color space in the color conversion table by using the selected at least one table. This means that the L*a*b* color space is not directly adjusted, color values of the CMYK color space are adjusted by using the LUT selected in response to the adjustment method, and the color conversion table is modified with color values after adjustment. According to this, even though the color adjustment is not carried out in the L*a*b* color space, color values of the CMYK color space are adjusted as if color values are directly adjusted in the L*a*b* color space. In addition, in the color adjustment process in accordance with the exemplary embodiment, as the L*a*b* color space is not directly adjusted, it is not necessary to convert the L*'a*'b*' color space after the adjustment into the CMYK color space again. Therefore, the time necessary for creating the color conversion table after the color adjustment is shortened.

In the above exemplary embodiment, the conversion unit 214 extracts records holding a* value and b* value included in a range of the specified adjustment region, and outputs them to the calculation unit 221 and the like. As a result, the color adjustment process is executed within a range of the adjustment region. According to this, the calculation amount for the color adjustment is reduced.

The calculation unit 221 selects at least one weighting function according to the adjustment region from weighting functions of which values of weight coefficients vary in response to the third color space, and carries out the color adjustment by using the selected weighting function. By using the weighting function according to the adjustment region, a fine adjustment is carried out so that the result of the color adjustment is achieved in the CMYK color space as if color values of the L*a*b* color space are directly adjusted.

In the above exemplary embodiment, when the color balance is adjusted, the adjustment is not carried out to K value. In addition, in the adjustment of the saturation, it may be possible not to carry out the adjustment to K value by not setting a map for black. This means that the color adjustment is not carried out to the color element K, and the value stored in the color conversion table before being changed is maintained. According to this, it is suppressed that the color adjustment to black results in the adjustment result that a user does not intend.

In the above exemplary embodiment, a description was given of a case where one of adjustment instructions for the saturation and the color balance was received. When adjustment instructions for both the saturation and the color balance are received, new color values based on one of adjustment instructions are calculated, and the color conversion table is modified with new color values. Then, new color values based on another adjustment instruction are calculated by using the color conversion table after the adjustment, and the color conversion table is further modified with calculated new color values.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

Figure 15:
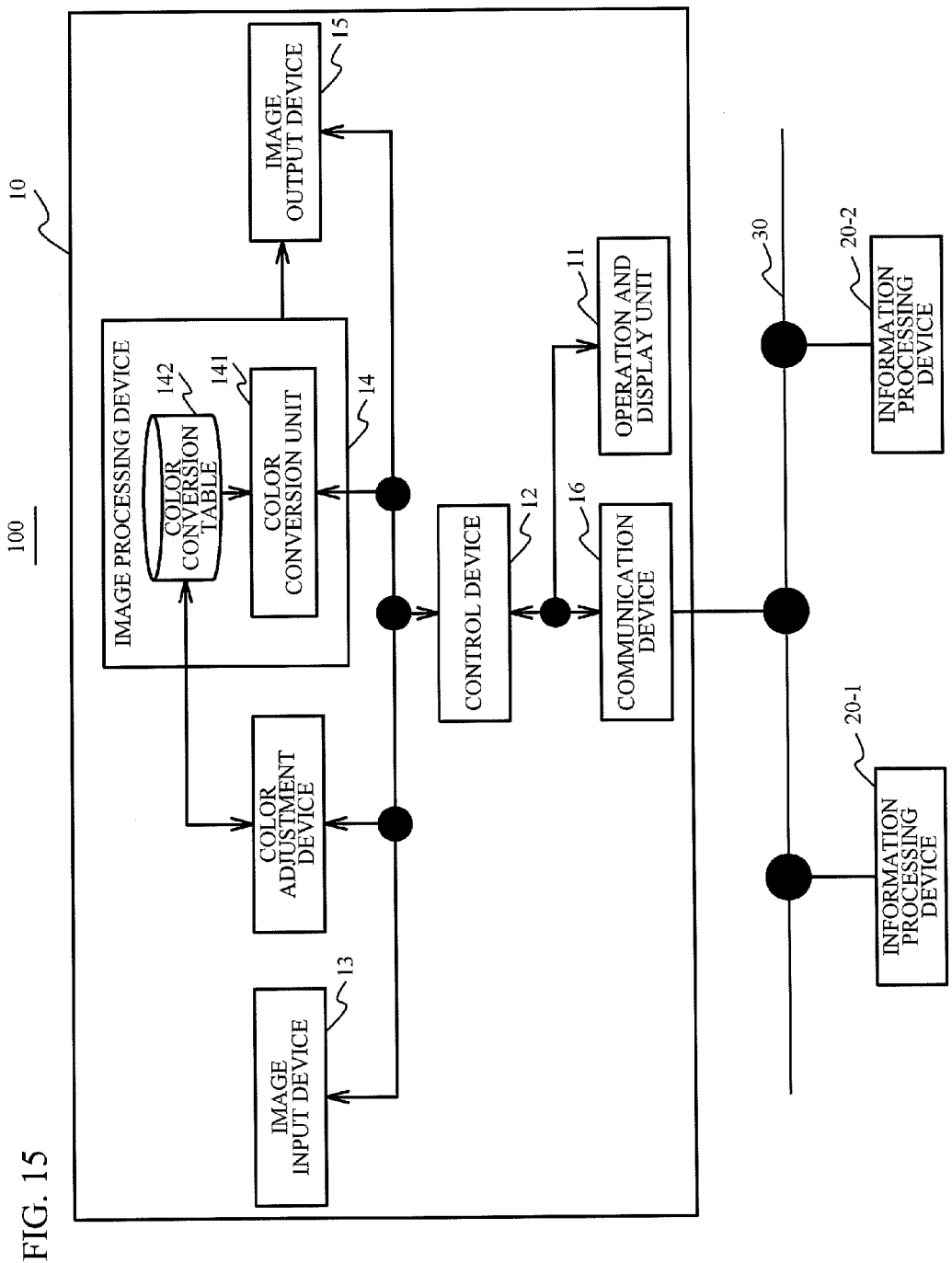
FIG. 15 is a diagram illustrating another example of a system configuration of the image forming system in accordance with the exemplary embodiment.

In the above exemplary embodiment, the information processing device 20 connected to the image forming apparatus 10 functions as the color adjustment device, but the image forming apparatus 10 may include the color adjustment device as illustrated in FIG. 15. In this case, the color adjustment device may receive the specification of the adjustment region and the adjustment instruction from the operation and display unit 11 of the image forming apparatus 10 via the control device 12.

In the above exemplary embodiment, output values are obtained by inputting color elements of color values of the CMYK color space to the one-dimensional lookup table determined based on the adjustment instruction for the saturation or the color balance. However, for example, output values may be obtained by inputting color elements of color values of the CMYK color space to formulas preliminarily set based on the adjustment instruction for the saturation or the color balance, for example.

The functions provided to the information processing device 20 in the above exemplary embodiments can be achieved by a computer provided with a CPU, a ROM, a RAM and the like. In that case, programs where the process of the function that the information processing device 20 has is written are provided. The process function described above can be implemented to the computer by executing programs by the computer. Programs where the content of the process is written can be stored in the computer readable medium.

Programs are distributed in a transportable recording medium such as DVDs (Digital Versatile Disc) and CD-ROMs (Compact Disc Read Only Memory) in which programs are recorded. Programs can be stored in a storage device of a server computer, and be transferred to other computers from the server computer via a network.

The computer executing programs stores programs recoded in the transportable recoding medium or programs transferred from the server computer to its storage device. Then, the computer reads a program from its storage device, and executes the process according to the program. The computer can read a program from the transportable recording medium directly and executes the process according to the program. The computer can executes a process according to a program that the computer receives every time when the program is transferred from the server computer.

What is claimed is:

1. A color adjustment device comprising:
a conversion unit that converts color values of a second color space stored in a color conversion table, which defines a correspondence relation between color values of a first color space and color values of the second color space, into color values of a third color space independent from a device outputting an image;
a storage unit that stores tables that have characteristics that output values with respect to an input value differing from each other depending on color values of the third color space;
a reception unit that receives an adjustment instruction for saturation;
a map storing unit that stores a map for determining a table to be used for color adjustment in accordance with an instruction for increasing or decreasing the saturation,
wherein the map is used to select the table to be used for the color adjustment from the tables stored in the storage unit,
wherein the map is prepared with respect to each color element of color values of the second color space,
wherein the map indicating that the table to be used for the color adjustment differs depending on color values of the third color space, and
wherein the map includes a map used when an instruction for increasing the saturation is received and a map used when an instruction for decreasing the saturation is received; and
a change unit that selects at least one table from the tables by referring to the map stored in the map storing unit based on the instruction for increasing or decreasing the saturation, and executes a change process that changes color values of the second color space stored in the color conversion table by using the at least one table.

2. The color adjustment device according to claim 1, wherein the storage unit stores ranges of color values of the third color space with respect to different adjustment regions to be subject to a color adjustment, and the change unit selects one adjustment region from the different adjustment regions according to a specified adjustment method, and executes the change process within the one adjustment region.

3. The color adjustment device according to claim 1, wherein the storage unit stores weighting functions of which coefficients vary in response to color values of the third color space, and the change unit selects at least one weighting function from the weighting functions according to a specified adjustment method, and executes the change process by using further the at least one weighting function.

4. The color adjustment device according to claim 1, wherein the change unit does not change at least one of color elements of color values of the second color space.

5. An image forming apparatus comprising:
a color conversion device; and
a color adjustment device, wherein
the color conversion device converts an input color signal into an output color signal by using a color conversion table that defines a correspondence relation between color values of a first color space and color values of a second color space, and
the color adjustment device includes:
a conversion unit that converts color values of the second color space stored in the color conversion table into color values of a third color space independent from a device outputting an image;

a storage unit that stores tables that have characteristics that output values with respect to an input value differing from each other depending on color values of the third color space;

a reception unit that receives an adjustment instruction for saturation;

a map storing unit that stores a map for determining a table to be used for color adjustment in accordance with an instruction for increasing or decreasing the saturation, wherein the map is used to select the table to be used for the color adjustment from the tables stored in the storage unit, wherein the map is prepared with respect to each color element of color values of the second color space, wherein the map indicating that the table to be used for the color adjustment differs depending on color values of the third color space, and wherein the map includes a map used when an instruction for increasing the saturation is received and a map used when an instruction for decreasing the saturation is received; and a change unit that selects at least one table from the tables by referring to the map stored in the map storing unit based on the instruction for increasing or decreasing the saturation, and executes a change process that changes color values of the second color space stored in the color conversion table by using the at least one table.

6. A non-transitory computer readable medium storing a program causing a computer to execute a process, the process comprising:

converting color values of a second color space stored in a color conversion table, which defines a correspondence relation between color values of a first color space and color values of the second color space, into color values of a third color space independent from a device outputting an image;

selecting at least one table from tables by referring to a map for determining a table to be used for color adjustment in accordance with an instruction for increasing or decreasing saturation based on the instruction for increasing or decreasing saturation, the tables having characteristics that output values with respect to an input value differing from each other depending on color values of the third color space and being stored in a storage unit, the map is used to select the table to be used for the color adjustment from the tables stored in the storage unit, the map is prepared with respect to each color element of color values of the second color space, the map indicating that the table to be used for the color adjustment differs depending on color values of the third color space, and the map includes a map used when an instruction for increasing the saturation is received and a map used when an instruction for decreasing the saturation is received; and executing a change process that changes color values of the second table stored in the color conversion table by using the at least one table.

7. A color adjustment device comprising:

a conversion unit that converts color values of a second color space stored in a color conversion table, which defines a correspondence relation between color values of a first color space and color values of the second color space, into color values of a third color space independent from a device outputting an image;

a storage unit that stores tables that have characteristics that output values with respect to an input value differing from each other depending on color values of the third color space;

a reception unit that receives an adjustment instruction for color balance;

a map storing unit that stores a map for determining a table to be used for color adjustment in accordance with a color direction to which the color balance is shifted, wherein the map is used to select the table to be used for the color adjustment from the tables stored in the storage unit, wherein the map is prepared with respect to each color element of color values of the second color space, and wherein the map indicating that the table to be used for the color adjustment differs depending on which color direction on the third color space the color direction to which the color balance is shifted is; and a change unit that selects at least one table from the tables by referring to the map stored in the map storing unit based on the adjustment instruction for the color balance, and executes a change process that changes color values of the second color space stored in the color conversion table by using the at least one table.

* * * * *